United States Patent
Argumedo

[19]

[11] Patent Number: 6,118,630
[45] Date of Patent: *Sep. 12, 2000

[54] COMPLIANT EDGE GUIDING AND FOLLOWING SYSTEM FOR TAPE

[75] Inventor: Armando Jesus Argumedo, Tucson, Ariz.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 09/064,726

[22] Filed: Apr. 23, 1998

[51] Int. Cl.[7] .................................................. G11B 15/60
[52] U.S. Cl. ............................... 360/130.21; 360/130.33; 242/346
[58] Field of Search ........................... 360/130.21, 130.2, 360/130.31, 130.33; 242/346, 346.1, 346.2; 226/196.1

[56] References Cited

U.S. PATENT DOCUMENTS

| | | | |
|---|---|---|---|
| 3,850,358 | 11/1974 | Nettles | 226/198 |
| 4,485,420 | 11/1984 | Schoenmakers | 360/130.21 |
| 5,251,844 | 10/1993 | Albrecht et al. | 242/179 |
| 5,297,755 | 3/1994 | Felde et al. | 242/199 |
| 5,357,390 | 10/1994 | Vollmann | 360/130.21 |
| 5,377,052 | 12/1994 | Guzman et al. | 360/106 |
| 5,432,652 | 7/1995 | Comeaux et al. | 360/77.12 |
| 5,447,279 | 9/1995 | Janssen et al. | 242/358 |
| 5,490,029 | 2/1996 | Madsen et al. | 360/130.21 |
| 5,519,562 | 5/1996 | Argumedo et al. | 360/130.21 |
| 5,572,393 | 11/1996 | Church et al. | 360/130.21 |
| 5,618,005 | 4/1997 | Todd et al. | 242/346 |

*Primary Examiner*—Brian E. Miller
*Attorney, Agent, or Firm*—John H. Holcombe; Robert M. Sullivan

[57] ABSTRACT

Disclosed is a compliant edge guiding and following system for recording tape. Two tape bearings are provided which define a tape path, each having a bearing surface for supporting lengthwise travel of the recording tape along the tape path. A movable tape head is positioned in the tape path between the tape bearings. The movable tape head includes a track following servo for moving the head laterally to follow lateral movement of the recording tape and maintain alignment therewith. A set of compliant tape edge guides are positioned at opposite edges of the tape path. The compliant tape edge guides of the set are a matched pair and are spaced apart laterally a distance substantially equal to the nominal width of the recording tape and positioned substantially equidistant from the centerline of the tape path. Separate sets may be positioned in the lengthwise direction on each side of, and each set closely spaced from, the movable tape head. The compliant edge guides allow lateral movement of the tape, which lateral movement is followed by the movable tape head. The compliant tape edge guides may be implemented in a drive or in a cartridge to be employed in a drive.

34 Claims, 5 Drawing Sheets

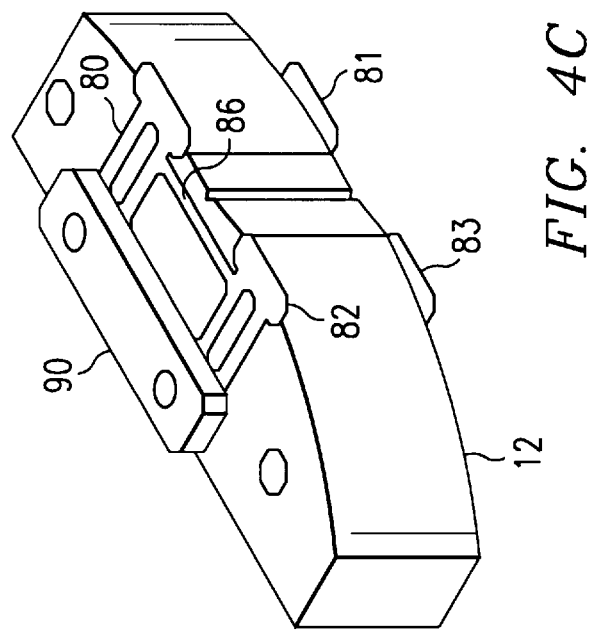
FIG. 4C
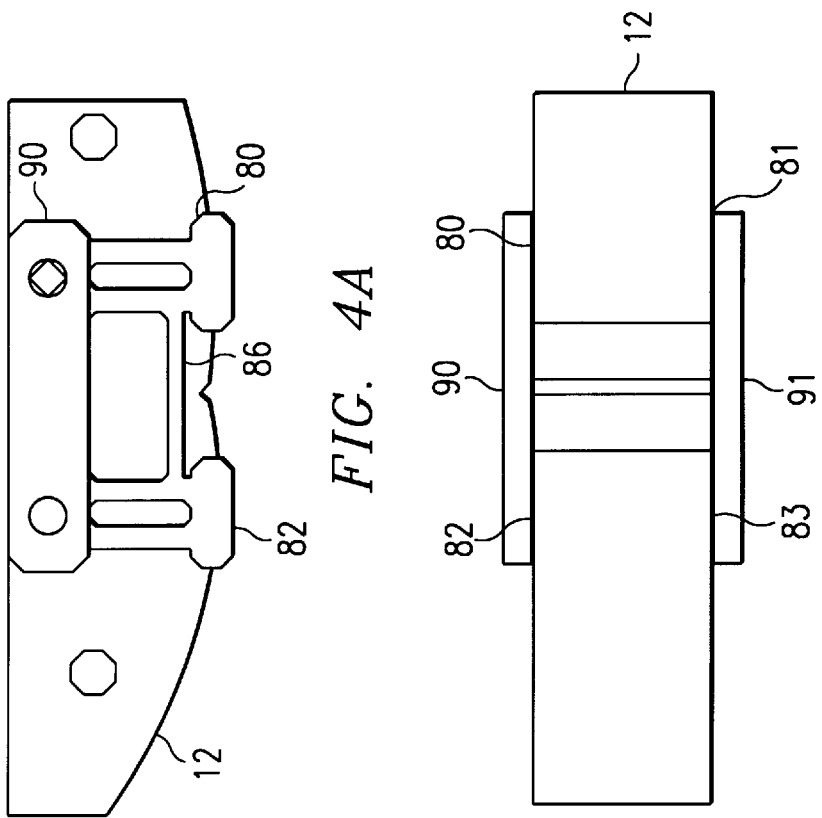
FIG. 4A
FIG. 4B

COMPLIANT EDGE GUIDING AND FOLLOWING SYSTEM FOR TAPE

Commonly assigned U.S. Pat. No. 5,377,052, Guzman et al., "Actuator Assembly for Servo-Controlled Magnetic Tape Head", is incorporated for its showing of a servo-controlled magnetic tape head actuator.

TECHNICAL FIELD

This invention relates to the guiding of recording tape with respect to a tape head, and, more particularly, to the edge guiding of recording tape with respect to a movable tape head, which tape is driven lengthwise along a tape path defined by at least one tape bearing.

BACKGROUND OF THE INVENTION

Recording tape, such as magnetic recording tape, provides a dense medium for the storage of large quantities of data. The data is typically written to the tape in a longitudinal, multi-track format. The dense data storage results from a high linear data density in the longitudinal direction and from closely packing the multiple tracks. The longitudinal tracks are closely packed by both reducing the width of each track and by reducing the distance between tracks. High track densities are achieved by recording tape which has track following servo information thereon and by tape drives which employ movable tape heads and track following servos. Thus, as the recording tape is moved longitudinally along a tape path and across the movable tape head, the track following servo is responsive to the track following servo information of the recording tape for moving the tape head laterally with respect to the tape path to follow any lateral movement of the recording tracks of the recording tape and maintain alignment of the tape head with respect to the recording tracks.

Conventional track following tape drives precisely fix the lateral position of one edge of the tape by means of tape guides having at least one fixed flange. The tape guides are positioned closely adjacent to and on either side of the tape head, in the longitudinal direction of the tape. Since the tape typically is not cut with perfectly straight edges, the tape guide at the edge opposite the fixed flange is often compliant, accommodating variations in the tape width.

However, the tape typically winds onto reels in a non-uniform profile which results in lateral tape motion at the head and tape guides when the tape is unwound at typical tape speeds. Thus, an outer set of tape guides, such as illustrated in U.S. Pat. No. 5,447,279, Janssen et al., are positioned further from the tape head, outside of the fixed tape guides, in the longitudinal direction of the tape. The outer set of tape guides is compliant on both sides of the tape and intended to apply gentle tape guidance and cause a "coarse correction" of the tape and reduce the force of the one edge of the tape against the fixed flanges of the inner tape guides. In such an arrangement, the inner tape guides are often called the "fine" tape guides.

This "coarse correction" tends to be insufficient to counter the collision of the tape edge and the fixed flanges of the inner tape guides. The result of this collision can be a damaged tape due to wear, buckling, stretching, and breakage of the tape. The tape drive can also be damaged by wear and by the accumulation of debris resulting from the collisions of many tapes with the fixed flanges.

SUMMARY OF THE INVENTION

It is therefore an object of the present invention to provide a system which guides recording tape with respect to a tape head while avoiding the damage to recording tape resulting from fixed flange tape guides in recording tape drives.

It is another object of the present invention to provide a gentle, compliant guiding system with the goal of enhancing the life and reliability of recording tape.

Disclosed is a compliant edge guiding and following system for recording tape. Preferably, the recording tape has track following servo information thereon. At least two tape bearings are provided which define a tape path, each having a bearing surface for supporting lengthwise travel of the recording tape along the tape path. The tape bearings may be curved in a cylindrical direction. A movable tape head is positioned in the tape path between the tape bearings, the movable tape head comprising a read/write transducer and a track following servo responsive to the track following servo information of the recording tape for moving the tape head laterally with respect to the tape path to follow lateral movement of the recording tape and maintain alignment of the tape head with the recording tape during the lengthwise travel thereof on the tape path. At least a set of two compliant tape edge guides are positioned, respectively, on opposite sides of the tape path at each edge thereof, and positioned in the lengthwise direction closely spaced along the tape path from the movable tape head. The compliant tape edge guides are spaced apart laterally a distance substantially equal to the nominal width of the recording tape and positioned substantially equidistant from the centerline of the tape path. Thus, the recording tape is allowed lateral movement on the tape path, the lateral movement thereof followed by the movable tape head.

At least two sets of compliant tape edge guides may be provided, each set positioned along the tape path at an opposite side of the movable head.

Each set of compliant edge guides may comprise a matched pair of at least one flexure and at least one tape edge guide, each flexure and tape edge guide at an opposite edge of the tape path. Each flexure and tape edge guide of the matched pair is formed from a sheet of resilient material, which may comprise a sheet of stainless steel. Alternatively, each of the matched pair of flexure and tape edge guides may each comprise a flexible beam affixing a ceramic tape edge guide.

The compliant tape edge guides may be implemented in a tape drive closely spaced from the movable tape head, or may be implemented in a tape cassette or cartridge which when loaded into a tape drive, are closely spaced from the movable tape head.

For a fuller understanding of the present invention, reference should be made to the following detailed description taken in conjunction with the accompanying drawings.

BRIEF DESCRIPTION OF THE DRAWINGS

FIGS. 4A, 4B and 4C are, respectively, side, plan and isometric views of an alternative embodiment of a compliant edge guide and tape bearing for the compliant edge guiding and following system of the present invention;

DETAILED DESCRIPTION OF THE INVENTION

Figure 1:
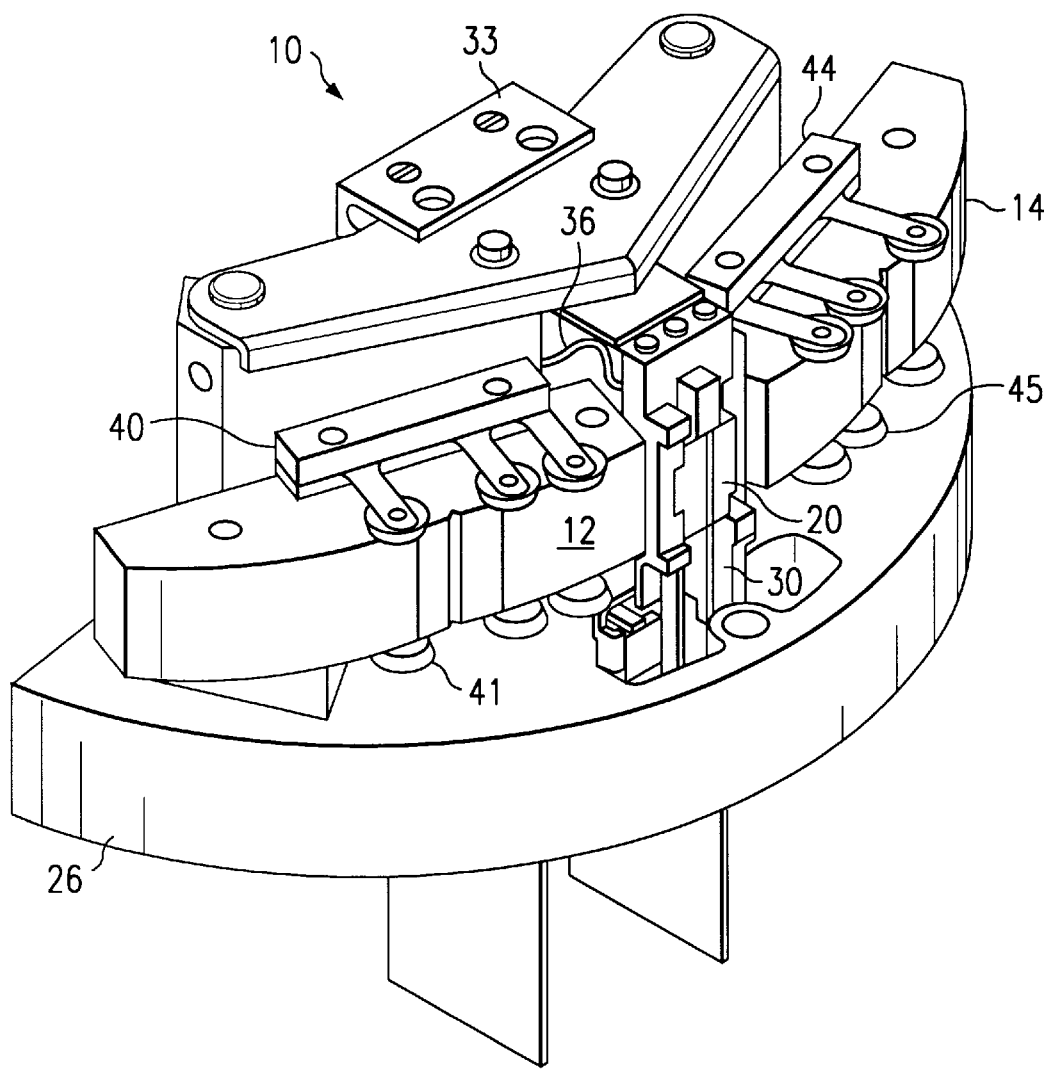
FIG. 1 is a perspective representation of an embodiment of a compliant edge guiding and following system for recording tape of the present invention.
Figure 2:
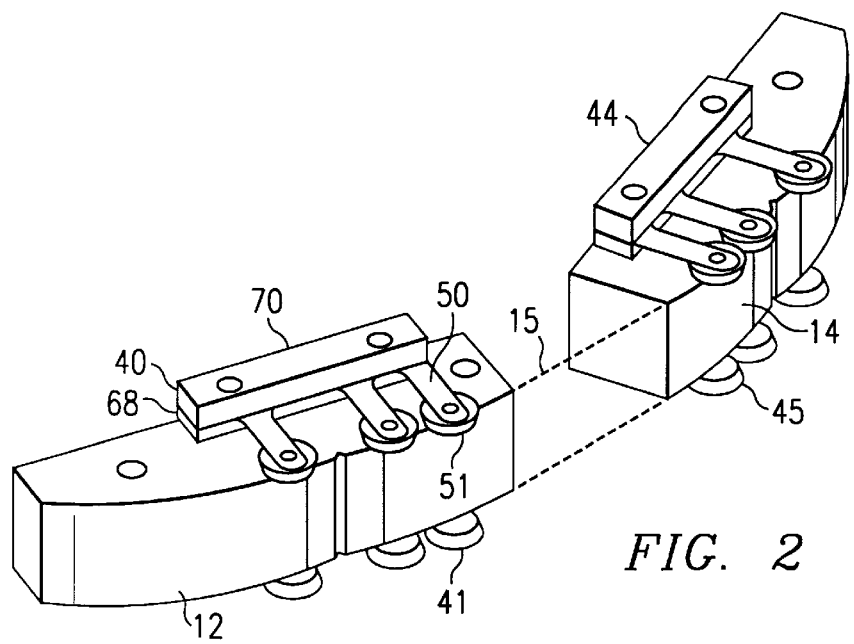
FIG. 2 is an isometric representation of the compliant edge guides and tape bearings of FIG. 1.

Referring to FIGS. 1 and 2, an embodiment of a tape guiding and following system 10 is illustrated in accordance with the present invention. Tape bearings 12 and 14, each having a bearing surface for supporting lengthwise travel of a recording tape, define a tape path 15 which extends across a tape head 20. The tape bearings and tape head are mounted on a base plate 26 to provide precise alignment of the tape path 15 with respect to the tape head 20 so that tracks of the tape, when aligned with the tape path, are laterally aligned with the tape head, and so that the tape exerts the correct pressure on the tape head. The tape bearings are preferably curved in a cylindrical direction to give recording tape on the tape path 15 a degree of stiffness. The full assembly gives the appearance of the letter "D" and is called a "D bearing assembly".

In high speed tape drive embodiments, the tape bearings 12 and 14 may be supplied with a pressurized fluid, such as air, at the surface of the bearings between the bearing surface and the tape path 15 to reduce friction between the bearings and recording tape and/or between the tape head 20 and recording tape.

Data is typically written to recording tape, such as magnetic recording tape, in a longitudinal, multi-track format. The longitudinal tracks are closely packed to maximize the stored data capacity by both reducing the width of each track and by reducing the distance between tracks. High track densities are achieved by recording tape which has track following servo information thereon. Thus, as the recording tape is moved longitudinally along the tape path 15 and across the movable tape head 20, a track following servo is responsive to the track following servo information of the recording tape for moving the tape head 20 laterally with respect to the tape path to follow any lateral movement of the recording tracks of the recording tape and maintain alignment of the tape head with respect to the recording tracks.

The incorporated '052 patent describes an embodiment of an actuator assembly 30 for moving the tape head 20 laterally with respect to the tape path 15 to follow lateral movement of the recording tracks of the recording tape. An example of a servo and data format for magnetic tape and the servo system for operating the actuator 30 is described in coassigned U.S. Pat. No. 5,432,652, Comeaux et al.

The actuator assembly 30 of the '052 patent is mounted on a support member 33, which has a high mass to reduce the adverse effect of external vibrations on the actuator assembly.

As described in the '052 patent, the movable tape head 20 comprises a read/write transducer and is conventionally connected to the circuit cards of the tape drive (including the servo system and data recording circuitry) by means of a ribbon cable 36. The servo system and actuator assembly 30 are responsive to the track following servo information of the recording tape for moving the tape head read/write transducer laterally with respect to the tape path to follow lateral movement of the recording tape and maintain alignment of the read/write transducer with the corresponding tracks of the recording tape during the lengthwise travel thereof on the tape path. Alternative embodiments of the servo system and actuator assembly may be visualized by those of skill in the art.

Conventional tape drives employ fixed flanges on one side of the tape bearings in order to align the recording tape with respect to the tape head. However, variations in the width of the tape, and lateral variations from the winding of tape on the reels, cause the data tracks of the tape to shift laterally and require the track following servo to maintain the alignment of the tracks with respect to the tape head. As described above, these variations tend to cause the tape to impact the fixed flanges and may damage the recording tape, reducing the life and reliability of the recording tape.

In accordance with the present invention, in the illustrated embodiment of FIGS. 1 and 2, at least a set of two compliant tape edge guides 40 and 41 are positioned, respectively, on opposite sides of the tape path 15 at each edge thereof. The set of compliant tape guides are positioned in the lengthwise direction closely spaced along the tape path from the movable tape head 20. The compliant tape edge guides 40 and 41 are spaced apart laterally a distance substantially equal to the nominal width of the recording tape and positioned substantially equidistant from the centerline of the tape path 15. Thus, the recording tape is allowed lateral movement on the tape path, the lateral movement thereof followed by the movable tape head.

A second set of compliant tape edge guides 44 and 45 may be provided, and each set 40–41 and 44–45 is positioned along the tape path 15 at an opposite side of the movable head 20. The servo system and actuator assembly 30 are responsive to the track following servo information of the recording tape for moving the tape head 20 laterally with respect to the tape path 15 to follow lateral movement of the recording tape and maintain alignment of the read/write transducer of the tape head with the recording tape during the lengthwise travel of the recording tape on the tape path. Unlike the conventional fixed flange "fine" tape guides which impact and restrict the movement of one edge of the tape, the two sets of compliant tape edge guides 40–41 and 44–45 of the present invention guide the recording tape in a more gentle and compliant manner, thereby enhancing the life and reliability of the recording tape.

Figure 3A:
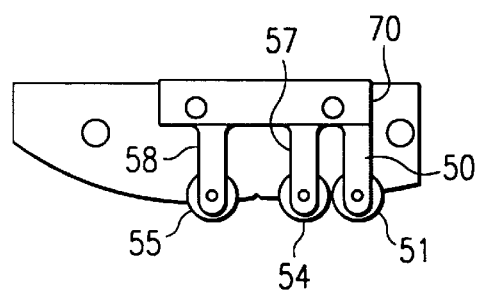
FIGS. 3A, 3B and 3C are, respectively, side, plan and end views of a compliant edge guide and tape bearing of FIGS. 1 and 2.
Figure 3B:
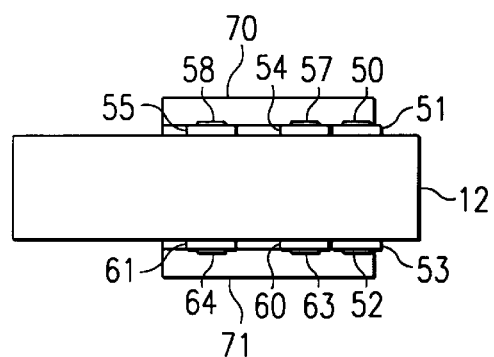
Figure 3C:
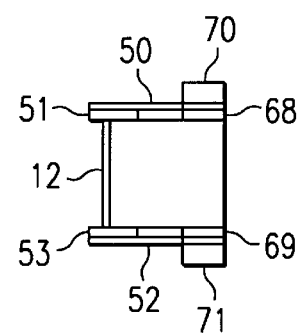

One embodiment of the set of compliant tape edge guides 40–41 or 44–45 of FIG. 2 in FIGS. 3A–3C.

Each set of compliant tape edge guides comprises a matched pair of at least one flexure 50 and at least one tape edge guide 51, and at least one flexure 52 and at least one tape edge guide 53, each on opposite sides of the tape bearing, e.g., tape bearing 12, and at an opposite edge of the tape path 15. The tape edge guides may each comprise a ceramic "button" affixed, e.g., by cementing, to a flexible beam flexure.

The set of compliant tape edge guides preferably comprises a matched pair of a plurality of tape edge guides and flexures on opposite sides of the tape path. In FIGS. 3A–3C, one half of the matched pair comprises tape edge guides 51, 54 and 55, each supported by a flexure 50, 57 and 58. The other half of the matched pair comprises tape edge guides 53, 60 and 61, each supported by a flexure 52, 63 and 64. The flexible beam flexures 50, 57 and 58, and 52, 63 and 64 of each of the matched pair, preferably comprises flexible beams formed from a common sheet of resilient material, such as stainless steel. For example, the stainless steel flexible beams may be 25–100 microns thick to become compliant.

The cantilever flexures are spaced from the sides of the tape bearings by spacers 68 and 69, respectively, and attached to the sides of the tape bearing by clamps 70 and 71. The spacers and clamps position the tape edge guides precisely at the edges of the tape path 15, spaced apart laterally a distance substantially equal to the nominal width of the recording tape and positioned substantially equidistant from the centerline of the tape path.

An alternative embodiment of the of the set of compliant tape edge guides 40–41 or 44–45 of FIG. 2 is illustrated in FIGS. 4A–4C.

Each set of compliant tape edge guides comprises a matched pair of at least one flexure and tape edge guide 80, and at least one flexure and tape edge guide 81, each on opposite sides of the tape bearing, e.g., tape bearing 12, and at an opposite edge of the tape path 15 of FIG. 2. Each flexure and tape edge guide comprises a common element. In FIGS. 4A–4C, one half of the matched pair comprises flexure and tape edge guides 80 and 82, and the other half of the matched pair comprises flexure and tape edge guides 81 and 83. The flexure and tape edge guides 80 and 82, and flexure and tape edge guides 81 and 83 of each of the matched pair, preferably are each formed from a common sheet of resilient material, such as stainless steel, and have an alignment bar 86 to insure proper spacing of the flexure and tape guides in the longitudinal direction. As described above, the the stainless steel flexure and tape guides may be 25–100 microns thick to become compliant. The flexure and tape guides, respectively, are attached at the sides of the tape bearing by clamps 90 and 91. The clamps position the tape edge guides precisely at the edges of the tape path 15, spaced apart laterally a distance substantially equal to the nominal width of the recording tape and positioned substantially equidistant from the centerline of the tape path.

Additional alternative configurations of the compliant tape edge guides of the present invention may be visualized by those of skill in the art.

Figure 5:
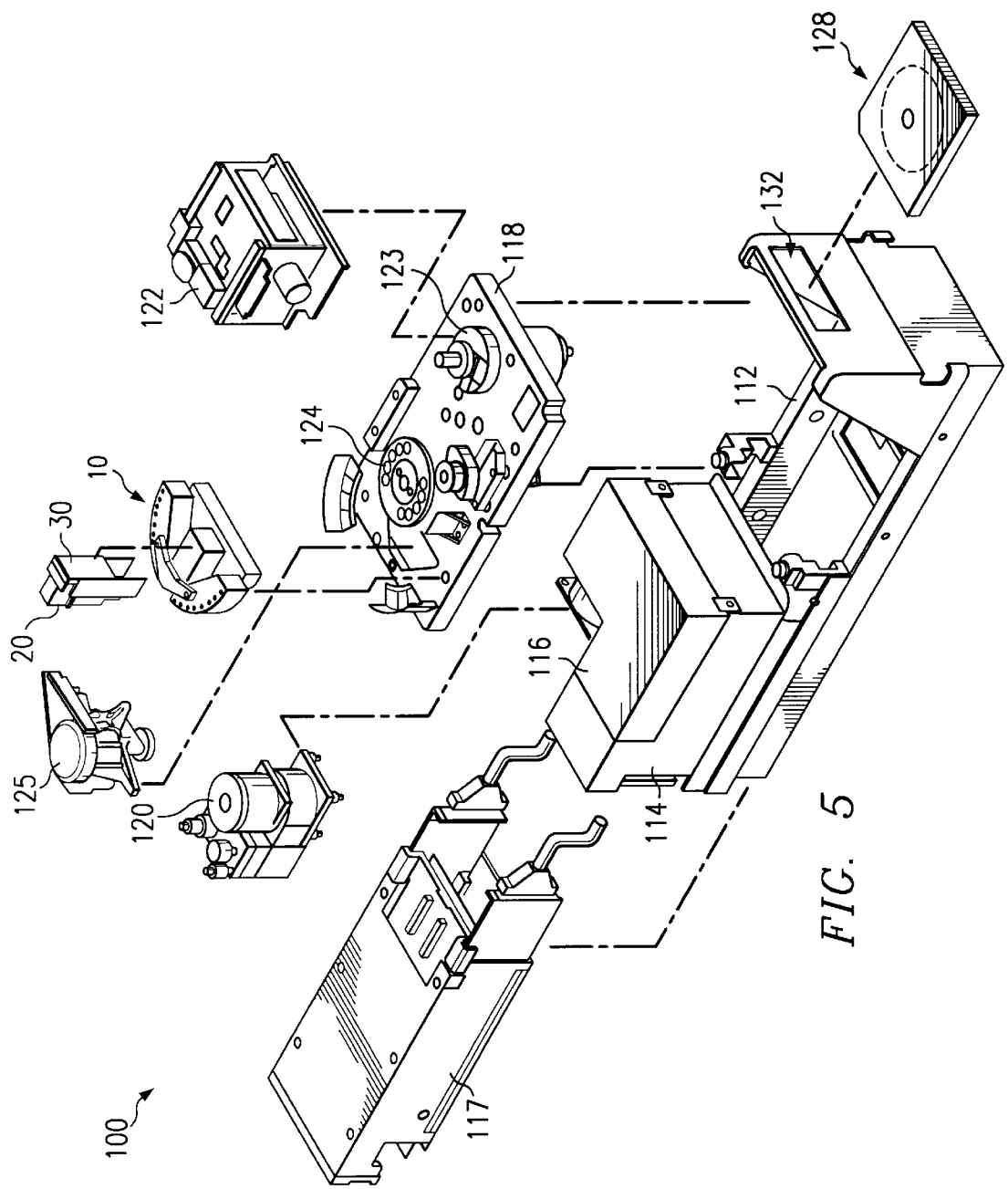
FIG. 5 is an exploded view of a magnetic tape drive of the present invention.

An exemplary magnetic tape drive 100 implementing the tape guiding and following system of the present invention is illustrated in FIG. 5. A base unit 112 is provided with a power supply 114, various electronic circuit cards 116 and 117, a deck assembly 118, and a pneumatic assembly 120. Mounted to the deck assembly 118 are a loader mechanism 122, supply reel drive 123, take up reel and drive 124, and tape threader 125. The tape guiding and following system 10 incorporating the servo system and actuator assembly 30 and movable head 20 are also attached to the deck 123.

A removable tape cartridge 128 having a supply reel wound with magnetic tape is inserted through a slot 132 in the base unit 112 and into the loader assembly 122. The loader assembly draws the cartridge into the deck 118 and lowers it onto the supply reel drive 123. The threader 125 engages a leader block attached to the free end of the tape and pulls it around the tape guiding and following system 10 and along the tape path. The leader block is then engaged by the take up reel and drive 124, and the tape may be moved along the tape path while the pneumatic system 120 provides a fluid to the tape bearings. The tape is moved across the movable tape head 20 to record data to or read data from the tape. As described above, the servo system and actuator assembly 30 are responsive to the track following servo information of the recording tape for moving the tape head 20 laterally with respect to the tape path to follow lateral movement of the recording tape and maintain alignment of the read/write transducer of the tape head with the recording tape during the lengthwise travel of the recording tape on the tape path.

While the tape drive 100 includes a take up reel 124 and accepts tape cartridges containing only the supply reel, the present invention is not limited to such a drive/cartridge combination, but may also employ other types of drives, such as those which accept tape cartridges which contain both supply and take up reels.

Figure 6:
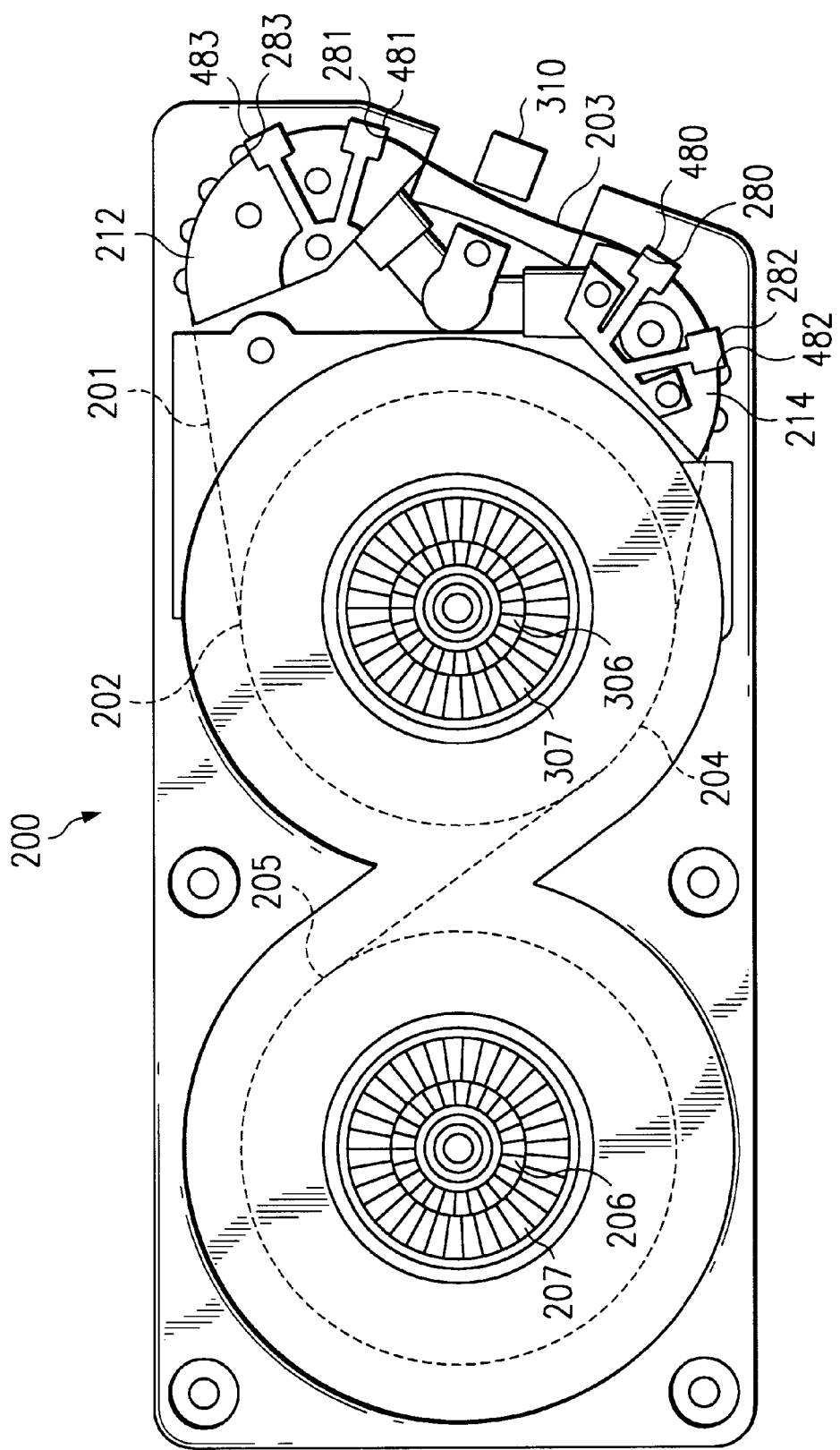
FIG. 6 is a plan view of magnetic tape cartridge having the compliant edge guide and tape bearing of FIGS. 4A–4C, and a movable tape head of a tape drive, in accordance with the present invention.

An alternative implementation of the present invention is illustrated in FIG. 6. The tape bearings 212 and 214 are positioned in a tape cassette 200. The tape cassette may, for example, be similar to that described in U.S. Pat. No. 5,297,755, Felde et al., "Tape Cartridge Tape Path", wherein hubs 206 and 306 support a length of tape that is positioned on a tape path from the outer wrap of reel 202 along tape path 201 to tape bearing 212, along tape path 203 to tape bearings 214, and then along tape path 204 to the outer wrap of reel 205. Hubs 206 and 306 are held in place, when out of a tape drive, by toothed circular brakes 207 and 307, respectively.

In acccordance with the present invention, a matched pair of flexure and tape edge guides 281, 283 and 481, 483 are mounted on tape bearing 212, and a matched pair of flexure and tape edge guides 280, 282 and 480, 482 are mounted on tape bearing 214. The guides of each pair at the top edge of the tape path are partially cut away to illustrate the guides of each pair at the bottom edge of the tape path. The illustrated matching pair of flexure and tape edge guides are those of FIGS. 4A–4C, but may also be those of FIGS. 2 and 3A–3C or any alternative embodiment.

Still referring to FIG. 6, the cassette 200 is placed into a tape drive, and movable head 310 of the present invention engages the tape at tape path 203. The tape is then moved along the tape path and the servo system and actuator respond to the track following servo information of the tape and move the tape head 310 laterally with respect to the tape path to follow lateral movement of the recording tape and maintain alignment of the read/write transducer of the tape head with the recording tape during the lengthwise travel of the recording tape on the tape path.

While the preferred embodiments of the present invention have been illustrated in detail, it should be apparent that modifications and adaptations to those embodiments may occur to one skilled in the art without departing from the scope of the present invention as set forth in the following claims.

I claim:

1. A compliant edge guiding and following system for recording tape, comprising:

at least one tape bearing for supporting lengthwise travel of said recording tape along a tape path;

a movable track following tape head positioned in said tape path and laterally movable with respect to said tape path to track follow lateral movement of said recording tape during said lengthwise travel thereof on said tape path; and at least one set of matching compliant fine tape edge guides at both the top and bottom edges of said tape path, each said compliant fine tape edge guide of said set positioned at an opposite edge of said tape path and each compliant in the lateral direction with respect to said tape path, said matching tape guides comprising matched cantilever flexures flexing in said lateral direction about a fixed base, and said set positioned in the lengthwise direction closely spaced along said tape path from and contiguous with said movable track following tape head, said compliant fine tape edge guides spaced apart laterally a distance substantially equal to the nominal width of said recording tape and positioned substantially equidistant from the centerline of said tape path, whereby said recording tape is allowed lateral movement on said tape path at said movable track following tape head, said lateral movement thereof followed by said movable track following tape head.

2. The compliant edge guiding and following system of claim 1, comprising at least two said tape bearings, each of said tape bearings positioned in the lengthwise direction along said tape path on opposite sides of said movable tape head, and comprising two said sets of compliant fine tape edge guides positioned along said tape path on opposite sides of said movable tape head, each said set closely spaced along said tape path from and contiguous with said movable tape head, allowing said lateral movement of said recording tape on said tape path at said movable tape head.

3. The compliant edge guiding and following system of claim 2, wherein at least one of said sets of compliant fine tape edge guides comprises a matched pair of at least one flexure and at least one tape edge guide, each at an opposite edge of said tape path.

4. The compliant edge guiding and following system of claim 3, wherein each of said matched pair of flexure and tape edge guides is formed from a sheet of resilient material.

5. The compliant edge guiding and following system of claim 4, wherein each said sheet of resilient material is stainless steel.

6. The compliant edge guiding and following system of claim 3, wherein each of said tape edge guides of said matched pair of flexure and tape edge guides comprises a ceramic tape edge guide affixed to said flexure.

7. The compliant edge guiding and following system of claim 6, wherein said flexures of each of said matched pair of flexure and tape edge guides each comprises a flexible beam affixing one of said ceramic tape edge guides.

8. The compliant edge guiding and following system of claim 3, wherein each of said matched pair of compliant fine tape edge guides comprises a matched pair of a plurality of flexures and a plurality of tape edge guides, each at an opposite edge of said tape path.

9. The compliant edge guiding and following system of claim 8, wherein each of said matched pair of flexure and tape edge guides is formed from a common sheet of resilient material.

10. The compliant edge guiding and following system of claim 9, wherein each said sheet of resilient material is stainless steel.

11. The compliant edge guiding and following system of claim 8, wherein each of said tape edge guides of said matched pair of flexure and tape edge guides comprises a ceramic tape edge guide affixed to said flexure.

12. The compliant edge guiding and following system of claim 11, wherein said flexure of each of said matched pair of flexure and tape edge guides comprises flexible beams formed from a common sheet of resilient material.

13. The compliant edge guiding and following system of claim 12, wherein each said sheet of resilient material is stainless steel.

14. A compliant edge guiding and following system for recording tape, comprising:

at least one tape bearing having a bearing surface curved in a cylindrical direction defining a tape path for supporting lengthwise travel of said recording tape along said tape path;

a movable track following tape head positioned in said tape path and laterally movable with respect to said tape path to track follow lateral movement of said recording tape during said lengthwise travel thereof on said tape path; and at least one set of matching compliant fine tape edge guides at both the top and bottom edges of said tape path, each said compliant fine tape edge guide of said set positioned at an opposite edge of said curved tape path at said at least one tape bearing and each compliant in the lateral direction with respect to said tape path, said matching tape guides comprising matched cantilever flexures flexing in said lateral direction about a fixed base, and said set positioned in the lengthwise direction closely spaced along said tape path from and contiguous with said movable track following tape head, said compliant fine tape edge guides spaced apart laterally a distance substantially equal to the nominal width of said recording tape and positioned substantially equidistant from the centerline of said tape path, whereby said recording tape is allowed lateral movement on said tape path at said movable track following tape head, said lateral movement thereof followed by said movable track following tape head.

15. The compliant edge guiding and following system of claim 14, comprising at least two said tape bearings, each of said tape bearings positioned in the lengthwise direction along said tape path on opposite sides of said movable tape head, and comprising two said sets of compliant fine tape edge guides positioned along said curved tape path, each said set positioned at one of said tape bearings on opposite sides of said movable tape head, each said set closely spaced along said tape path from and contiguous with said movable tape head, wherein at least one of said sets of compliant fine tape edge guides comprises a matched pair of at least one flexure and at least one tape edge guide, each at an opposite edge of said tape path, allowing said lateral movement of said recording tape on said tape path at said movable tape head.

16. The compliant edge guiding and following system of claim 15, wherein each of said matched pair of flexure and tape edge guides is formed from a sheet of resilient material, and wherein said formed flexure and tape edge guides are attached to opposite edges of said tape bearings.

17. The compliant edge guiding and following system of claim 16, wherein each said sheet of resilient material is stainless steel.

18. The compliant edge guiding and following system of claim 15, wherein each of said tape edge guides of said matched pair of flexure and tape edge guides comprises a ceramic tape edge guide affixed to said flexure.

19. The compliant edge guiding and following system of claim 18, wherein said flexures of each of said matched pair of flexure and tape edge guides each comprises a flexible beam affixing one of said ceramic tape edge guides, said flexible beams attached to opposite edges of said tape bearings.

20. The compliant edge guiding and following system of claim 15, wherein each of said matched pair of compliant fine tape edge guides comprises a matched pair of a plurality of flexures and a plurality of tape edge guides, each at an opposite edge of said tape path, and each attached to opposite edges of said tape bearings.

21. The compliant edge guiding and following system of claim 20, wherein each of said matched pair of flexure and tape edge guides is formed from a common sheet of resilient material.

22. The compliant edge guiding and following system of claim 21, wherein each said sheet of resilient material is stainless steel.

23. The compliant edge guiding and following system of claim 20, wherein each of said tape edge guides of said matched pair of flexure and tape edge guides comprises a ceramic tape edge guide affixed to said flexure.

24. The compliant edge guiding and following system of claim 23, wherein said flexure of each of said matched pair of flexure and tape edge guides comprises flexible beams formed from a common sheet of resilient material.

25. The compliant edge guiding and following system of claim 24, wherein each said sheet of resilient material is stainless steel.

26. A compliant edge guiding and following system for recording tape, said recording tape having track following servo information thereon, comprising:

at least two tape bearings defining a tape path, each having a bearing surface curved in a cylindrical direction for supporting lengthwise travel of said recording tape along said tape path;

a movable track following tape head positioned in said tape path between said at least two tape bearings, said movable tape head comprising a read/write transducer and a track following servo responsive to said track following servo information of said recording tape for moving said read/write transducer laterally with respect to said tape path to track follow lateral movement of said recording tape and maintain alignment of said read/write transducer with said recording tape during said lengthwise travel thereof on said tape path; and two sets of matching compliant fine tape edge guides, each set at both the top and bottom edges of said tape path, each said compliant fine tape edge guide of each of said sets positioned at an opposite edge of said tape path and each compliant in the lateral direction with respect to said tape path, said matching tape guides comprising matched cantilever flexures flexing in said lateral direction about a fixed base, and each said set positioned in the lengthwise direction on opposite sides of, and closely spaced along said tape path from and contiguous with, said movable track following tape head, said compliant fine tape edge guides spaced apart laterally a distance substantially equal to the nominal width of said recording tape and positioned substantially equidistant from the centerline of said tape path, whereby said recording tape is allowed lateral movement on said tape path at said movable track following tape head, said lateral movement thereof followed by said movable track following tape head.

27. The compliant edge guiding and following system of claim 26, wherein at least one of said sets of compliant fine tape edge guides comprises a matched pair of at least one flexure and at least one tape edge guide, each at an opposite edge of said tape path.

28. A tape drive for reading and/or writing data on recording tape, said recording tape having track following servo information thereon, comprising:

at least two tape bearings defining a tape path, each having a bearing surface curved in a cylindrical direction for supporting lengthwise travel of said recording tape along said tape path;

a drive motor and reel mechanism for driving said recording tape in said lengthwise direction of travel;

a movable track following tape head positioned in said tape path between said at least two tape bearings, said movable track following tape head comprising a read/write transducer and a track following servo responsive to said track following servo information of said recording tape for moving said read/write transducer laterally with respect to said tape path to track follow lateral movement of said recording tape and maintain alignment of said read/write transducer with said recording tape during said lengthwise travel thereof on said tape path; and two sets of matching compliant fine tape edge guides, each set at both the top and bottom edges of said tape path, each said compliant fine tape edge guide of each of said sets positioned at an opposite edge of said tape path and each compliant in the lateral direction with respect to said tape path, said matching tape guides comprising matched cantilever flexures flexing in said lateral direction about a fixed base, and each said set positioned in the lengthwise direction on opposite sides of, and closely spaced along said tape path from and contiguous with, said movable track following tape head, said compliant fine tape edge guides spaced apart laterally a distance substantially equal to the nominal width of said recording tape and positioned substantially equidistant from the centerline of said tape path, whereby said recording tape is allowed lateral movement on said tape path at said movable track following tape head, said lateral movement thereof followed by said movable track following tape head.

29. The tape drive of claim 28, wherein at least one of said sets of compliant fine tape edge guides comprises a matched pair of at least one flexure and at least one tape edge guide, each at an opposite edge of said tape path.

30. A compliant edge guiding system for a cartridge, said cartridge for containing recording tape, said cartridge for positioning said recording tape in a tape path for interfacing with a movable tape head at an interface, said movable tape head laterally movable with respect to said tape path to follow lateral movement of said recording tape during said lengthwise travel thereof on said tape path, said compliant edge guiding system comprising:

at least one tape bearing for supporting lengthwise travel of said recording tape positioned in said cartridge along said tape path; and at least one set of matching compliant fine tape edge guides at both the top and bottom of said tape path, each said compliant fine tape edge guide of said set positioned in said cartridge at an opposite edge of said tape path and each compliant in the lateral direction with respect to said tape path, said matching tape guides comprising matched cantilever flexures flexing in said lateral direction about a fixed base, and said set positioned at said at least one tape bearing and positioned in the lengthwise direction closely spaced along said tape path from and contiguous with said movable tape head interface, said compliant fine tape edge guides spaced apart laterally a distance substantially equal to the nominal width of said recording tape and positioned substantially equidistant from the centerline of said tape path, whereby said recording tape is allowed lateral movement on said tape path at said movable tape head interface, said lateral movement thereof followed by said movable tape head.

31. The compliant edge guiding of claim 30, comprising at least two said tape bearings, each of said tape bearings positioned in said cartridge in the lengthwise direction along said tape path on opposite sides of said movable tape head interface, and comprising two said sets of compliant fine tape edge guides positioned along said tape path on opposite sides of said movable tape head interface, each said set closely spaced along said tape path from and contiguous with said movable tape head interface, allowing said lateral movement of said recording tape on said tape path at said movable tape head interface.

32. The compliant edge guiding and following system of claim 31, wherein at least one of said sets of compliant fine tape edge guides comprises a matched pair of at least one flexure and at least one tape edge guide, each at an opposite edge of said tape path.

33. The compliant edge guiding and following system of claim 32, wherein each of said matched pair of flexure and tape edge guides is formed from a sheet of resilient material.

34. The compliant edge guiding and following system of claim 32, wherein each of said tape edge guides of said matched pair of flexure and tape edge guides comprises a ceramic tape edge guide affixed to said flexure.

* * * * *